United States Patent
Wang

(10) Patent No.: US 10,816,833 B2
(45) Date of Patent: Oct. 27, 2020

(54) TEST APPARATUS OF LIQUID CRYSTAL DISPLAY

(71) Applicant: Wuhan China Star Optoelectronics Technology Co., Ltd., Wuhan (CN)

(72) Inventor: Lijun Wang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 49 days.

(21) Appl. No.: 16/349,982

(22) PCT Filed: Mar. 27, 2019

(86) PCT No.: PCT/CN2019/079933
§ 371 (c)(1),
(2) Date: May 15, 2019

(87) PCT Pub. No.: WO2020/042602
PCT Pub. Date: Mar. 5, 2020

(65) Prior Publication Data
US 2020/0264458 A1    Aug. 20, 2020

(30) Foreign Application Priority Data
Aug. 31, 2018 (CN) .......................... 2018 1 1009699

(51) Int. Cl.
*G02F 1/13* (2006.01)
(52) U.S. Cl.
CPC .................................. *G02F 1/1309* (2013.01)

(58) Field of Classification Search
CPC .. G01R 31/2635; G09G 3/006; G09G 3/3233; G09G 2330/12; H04N 9/3191
See application file for complete search history.

(56) References Cited

U.S. PATENT DOCUMENTS

| | | | |
|---|---|---|---|
| 6,545,500 B1 * | 4/2003 | Field | G09G 3/006 324/750.12 |
| 10,127,871 B2 * | 11/2018 | Toyoshima | G09G 3/3655 |
| 2010/0118007 A1 * | 5/2010 | Hori | G09G 3/3614 345/207 |
| 2015/0122993 A1 | 5/2015 | Noji et al. | |

FOREIGN PATENT DOCUMENTS

| | | |
|---|---|---|
| CN | 1820346 | 8/2006 |
| CN | 101097170 | 1/2008 |
| CN | 101641632 | 2/2010 |
| CN | 101814281 | 8/2010 |
| CN | 208737125 | 4/2019 |
| JP | 07-260698 | 10/1995 |

* cited by examiner

*Primary Examiner* — Tung X Nguyen

(57) ABSTRACT

A test apparatus of a liquid crystal display is provided, which includes a heating platform, a temperature control box, a tubular assembly, a photoelectric detector assembly and a shutter assembly. An upper surface of the heating platform is provided with a heating area. An opening is defined in a top of the temperature control box. The tubular assembly is connected to the temperature control box around the opening. The shutter assembly is disposed within the tubular assembly. The photoelectric detector assembly is disposed on a top of the tubular assembly and faces toward to the temperature control box.

18 Claims, 1 Drawing Sheet

TEST APPARATUS OF LIQUID CRYSTAL DISPLAY

RELATED APPLICATIONS

This application is a National Phase of PCT Patent Application No. PCT/CN2019/079933 having International filing date of Mar. 27, 2019, which claims the benefit of priority of Chinese Patent Application No. 201811009699.2 filed on Aug. 31, 2018. The contents of the above applications are all incorporated by reference as if fully set forth herein in their entirety.

FIELD AND BACKGROUND OF THE INVENTION

The present invention relates to a field of display technology, and more particularly to a test apparatus of a liquid crystal display.

The liquid crystal display equipped in the mobile phone and the vehicle are sometimes used in rigorous conditions, so that the response time at low temperature is required to be measured. However, it is very difficult to measure the response time of a liquid crystal display under low temperature conditions. The usual practice is to place the sample device and a photomultiplier tube (PMT) with function of fast sampling (1 MHz or above) in a temperature control box, then record the light intensity curve and calculates the corresponding response time based on the light intensity curve. Due to the measurement distance and the limitation of the volume of the PMT, the equipment for the measurement has a large volume. Furthermore, the heating and cooling time is long, whereby the measurement efficiency is not high. Condensed water is generated at the low temperature, and the PMT is easily damaged in such an environment for a long time.

Therefore, the presently-used technology has drawbacks and is in need of improvement urgently.

SUMMARY OF THE INVENTION

The purpose of the present application is to provide a test apparatus of a liquid crystal display, which is capable of preventing condensation water from being generated in the temperature control box.

The present invention provides a test apparatus of a liquid crystal display, which includes a heating platform, a temperature control box, a tubular assembly, a photoelectric detector assembly and a shutter assembly. An upper surface of the heating platform is provided with a heating area. The temperature control box is disposed on the heating area. An opening is defined in a top of the temperature control box. The tubular assembly is connected to the temperature control box around the opening and communicates with an inside of the temperature control box. The shutter assembly is disposed within the tubular assembly. The photoelectric detector assembly is disposed on a top of the tubular assembly and faces toward to the temperature control box. The shutter assembly is opened when test is carried out and closed when the heating platform heats or cools.

The tubular assembly includes a through hole in a wall thereof, and the through hole is positioned above the shutter assembly and connects with an inlet pipe to entrance of drying gas.

The photoelectric detector assembly includes a photoelectric detector, a photoelectric detection lens and an interface structure.

The interface structure is disposed on the top of the tubular assembly, and the photoelectric detection lens is disposed on a bottom of the photoelectric detector. The photoelectric detection lens is connected to the interface structure and is coaxially arranged with the tubular assembly, the interface structure is provided with a hollow communicating with the tubular assembly, and the photoelectric detection lens is docked in the hollow.

The test apparatus of a liquid crystal display of the present invention further includes a gas supply device used for providing drying gas, wherein the gas supply device communicates with the inlet pipe.

In the test apparatus of a liquid crystal display of the present invention, the interface structure includes a substrate and a tubular connector. The tubular connector is arranged along a boundary of the substrate. The hollow is positioned in a central portion of the substrate, and an elastic limiting ring is arranged between an inner side of the tubular connector and an outer side of the photoelectric detection lens.

In the test apparatus of a liquid crystal display of the present invention, the temperature control box includes a box having a top end and a bottom end, a cover covering the top end of the box. The bottom end of the box is positioned corresponding to the heating area.

In the test apparatus of a liquid crystal display of the present invention, the cover is a transparent acrylic cover or a transparent glass cover.

In the test apparatus of a liquid crystal display of the present invention, the opening is defined in the cover, the tubular assembly includes a hollow tube and a joint structure, and the hollow tube is hermetically connected to the opening of the top end of the cover through the joint structure.

In the test apparatus of a liquid crystal display of the present invention, the joint structure includes a clamping member and an elastic sealing ring positioned within the clamping member. The clamping member surrounds the opening, a bottom end of the hollow tube is inserted into the clamping member, and the elastic sealing ring is sleeved to the bottom end of the hollow tube and is abutted against the inner wall of the clamping member elastically.

In the test apparatus of a liquid crystal display of the present invention, an inner wall of the clamping member is coated with a black opaque coating.

The embodiment of the present application is further to provide a test apparatus of a liquid crystal display, which includes a heating platform, a temperature control box, a tubular assembly, a photoelectric detector assembly and a shutter assembly.

An upper surface of the heating platform is provided with a heating area. The temperature control box is disposed on the heating area and an opening is defined in a top of the temperature control box. The tubular assembly is connected to the temperature control box around the opening and communicates with an inside of the temperature control box. The shutter assembly is disposed within the tubular assembly. The photoelectric detector assembly is disposed on a top of the tubular assembly and faces toward to the temperature control box. The shutter assembly is opened when test is carried out and closed when the heating platform heats or cools.

In the test apparatus of a liquid crystal display of the present invention, the tubular assembly includes a through hole in a wall thereof. The through hole is positioned above the shutter assembly and connects with an inlet pipe to entrance of drying gas.

The test apparatus of a liquid crystal display of the present invention further includes a gas supply device used for providing drying gas, wherein the gas supply device communicates with the inlet pipe.

In the test apparatus of a liquid crystal display of the present invention, the photoelectric detector assembly includes a photoelectric detector, a photoelectric detection lens and an interface structure. The interface structure is disposed on the top of the tubular assembly. The photoelectric detection lens is disposed on a bottom of the photoelectric detector. The photoelectric detection lens is connected to the interface structure and is coaxially arranged with the tubular assembly. The interface structure is provided with a hollow communicating with the tubular assembly. The photoelectric detection lens is docked in the hollow.

In the test apparatus of a liquid crystal display of the present invention, the interface structure includes a substrate and a tubular connector. The tubular connector is arranged along a boundary of the substrate. The hollow is positioned in a central portion of the substrate, and an elastic limiting ring is arranged between an inner side of the tubular connector and an outer side of the photoelectric detection lens.

In the test apparatus of a liquid crystal display of the present invention, the temperature control box includes a box having a top end and a bottom end and a cover covering the top end of the box. The bottom end of the box is positioned corresponding to the heating area.

In the test apparatus of a liquid crystal display of the present invention, the cover is a transparent acrylic cover or a transparent glass cover.

In the test apparatus of a liquid crystal display of the present invention, the opening is defined in the cover, the tubular assembly includes a hollow tube and a joint structure, and the hollow tube is hermetically connected to the opening of the top end of the cover through the joint structure.

In the test apparatus of a liquid crystal display of the present invention, the joint structure includes a clamping member and an elastic sealing ring positioned within the clamping member. The clamping member surrounds the opening, a bottom end of the hollow tube is inserted into the clamping member, and the elastic sealing ring is sleeved to the bottom end of the hollow tube and is abutted against the inner wall of the clamping member elastically.

In the test apparatus of a liquid crystal display of the present invention, an inner wall of the clamping member is coated with a black opaque coating.

The test apparatus of a liquid crystal display provided by the present application is configured by setting a shutter assembly in a tubular assembly. The shutter assembly in the temperature control box is used for opening during measurement, and meanwhile, the air in the hollow tube is almost not subjected to heat exchange with the gas in the temperature control box by filling the drying gas, so that condensed water can be prevented from being generated on the sample to be tested, and the sample to be tested can be protected.

BRIEF DESCRIPTION OF THE SEVERAL VIEWS OF THE DRAWINGS

In order to more clearly illustrate the technical solutions in the embodiments of the present invention, the following figures will be described in the embodiments are briefly introduced. It is obvious that the drawings are only some embodiments of the present invention, those of ordinary skill in this field can obtain other figures according to these figures without paying the premise.

DESCRIPTION OF SPECIFIC EMBODIMENTS OF THE INVENTION

Figure 1:
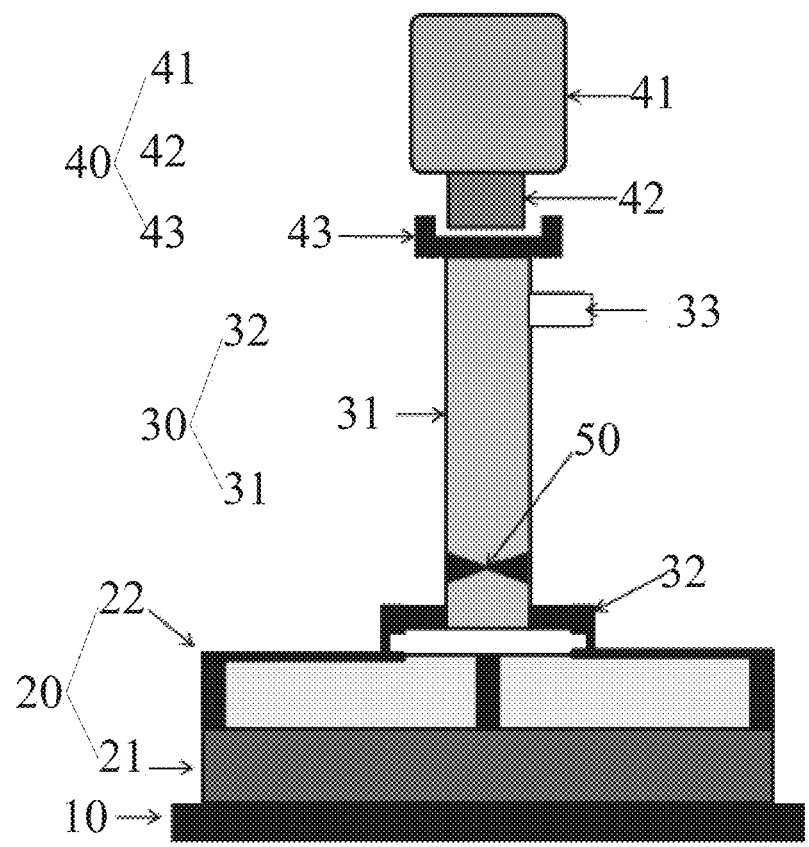
FIG. 1 is a schematic diagram of a test apparatus of a liquid crystal display according to an embodiment of the present invention.

The technical solutions in the embodiments of the present application will be clearly and completely described in the following with reference to the accompanying drawings in the embodiments. Apparently, the described embodiments are merely a part of the embodiments of the present application, and not all of them.

All other embodiments obtained by a person skilled in the art based on the embodiments of the present application without creative efforts are within the scope of the present application.

It is to be understood that the terms showing the indicated orientation or positional relationship mentioned in the present invention, such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc., are merely for the convenience of describing this application and a simplified description. Instead of indicating or implying that the device or component referred to must have a particular orientation, constructed and operated in a particular orientation, it is not to be construed as limiting the application. In addition, the terms "first" and "second" are used only for purposes of description, and are not to be construed as indicating or implying a relative importance or implicitly indicating the number of the indicated technical features. Thus, the feature defined with the "first" or "second" may include one or more of the described features either explicitly or implicitly. In the description of the present application, the meaning of "a plurality" is two or more, unless explicitly stated otherwise.

In the description of the present application, it should be noted that the terms "installation", "connected", and "connected" unless explicitly stated and limited, the connection should be construed broadly, for example, the connection can be fixedly connected, and can also be detachably connected or integrally connected; the device can be mechanically connected, can be electrically connected or can be in communication with each other, and can be directly connected, and can also be indirectly connected through an intermediate medium, and can be in communication between two elements or an interaction relationship of the two elements.

For persons of ordinary skill in the art, the specific meanings of the terms in the application can be understood according to specific situations. In the present application, unless explicitly stated and defined otherwise, the first feature "on" or "under" the second feature may include direct contact of the first and second features, and it may also include that the first and second features are indirectly contacted and contacted by additional features therebetween. Moreover, the first feature "above", "on" and "upper" the second feature include the first feature right above and obliquely above the second feature, or only indicates that the height of the first feature is higher than the second feature. Moreover, the first feature "below", "under" and "lower" the second feature include the first feature right below and obliquely below the second feature, or only indicates that the height of the first feature is lower than the second feature.

The following disclosure provides many different embodiments or examples for implementing the different structures of the present application. In order to simplify the disclosure of the present application, the components and settings of the specific examples are described below. Of course, they are merely examples and are not intended to limit the application. In addition, reference numerals and/or reference letters can be repeated in different examples, such repetition is for the purpose of simplicity and clarity, and is not intended to indicate the relationship between the various embodiments and/or arrangements discussed. In addition, various specific processes and examples of materials are provided, the application of other processes and/or the use of other materials can be recognized by one of ordinary skill in the art.

Referring to FIG. 1, FIG. 1 is a schematic diagram of a test apparatus of a liquid crystal display according to an embodiment of the present invention, wherein the test apparatus of the liquid crystal display includes a heating platform 10, a temperature control box 20, a tubular assembly 30, a photoelectric detector assembly 40 and a shutter assembly 50.

An upper surface of the heating platform 10 is provided with a heating area. The temperature control box 20 is disposed on the heating area. An opening is defined in a top of the temperature control box 20. The tubular assembly 30 is connected to the temperature control box 20 around the opening and communicates with an inside of the temperature control box 20. The shutter assembly 50 is disposed within the tubular assembly 30. The photoelectric detector assembly 40 is disposed on a top of the tubular assembly 30 and faces toward to the temperature control box 20. The shutter assembly 50 is opened when test is carried out and closed when the heating platform heats or cools.

In some embodiments, in particular, the heating platform 10 is generally in the form of a plate-like structure having a heating element disposed therein and which fills the heating area. The heating platform 10 itself is made of a metal having excellent thermal conductivity, and the heating element is embedded in a heating area. The heating element is a semiconductor heating element; that is, the temperature of the heating element can be raised or lowered, and the change of the heating or cooling can be realized by changing the direction of the current flowing through the semiconductor heating element. The temperature control system uses semiconductor heating. The sample can be placed directly on the heating platform 10 or it can be supported by a suspended support and suspended in the air. The heating platform 10 is connected to the controller through a control line, and the heating and cooling are controlled. A high-precision thermocouple is arranged inside the heating platform 10, so that the heating temperature of the platform can be accurately controlled.

When measuring the response time, the shutter is closed firstly. The clean dry air (CDA) is introduced to enter the temperature control box 20 to raise or lower the temperature to the target value. Then, the shutter of the shutter assembly 50 is opened by the electronic device, and the measuring instrument is started to test the response time. The response time will be measured within 2 to 3 seconds, so the surface temperature of the tested liquid crystal display panel will hardly change.

In some embodiments, the temperature control box 20 includes a box 21 having a top end and a bottom end, and a cover 22 covering the top end of the box 21. The bottom end of the box is positioned corresponding to the heating area. The cover 22 is a transparent acrylic cover or a transparent glass cover. The box 21 has a two-layer structure. The opening is positioned above the cover 22.

In some embodiments, the tubular assembly 30 includes a hollow tube 31 and a joint structure 32 configured to hermetically connect the hollow tube 31 and the opening of the cover 22 together. The hollow tube 31 has a substantially circular shape, and a through hole is formed in a wall thereof. An inlet pipe 33 for the entrance of drying gas is connected to the through hole. The through hole is positioned above the shutter assembly 50.

In some embodiments, the joint structure 32 includes a clamping member and an elastic sealing ring positioned within the clamping member. The clamping member surrounds the opening of the cover 22. A bottom end of the hollow tube 31 is inserted into the clamping member, and the elastic sealing ring is sleeved to the bottom end of the hollow tube 31 and is abutted against the inner wall of the clamping member elastically. The inner wall of the hollow tube 31 is coated with a black opaque coating. In some embodiments, the hollow tube 31 is made of electrochromic glass, and the transparency can be adjusted as needed to facilitate the test.

In some embodiments, the test apparatus of a liquid crystal display further includes a gas supply device used for providing the drying gas, wherein the gas supply device communicates with the inlet pipe 33. The gas supply device is communicated with the inlet pipe 33 through a conduit, and the conduit is further provided with an electromagnetic valve. Whether the drying gas is allowed to enter the hollow tube 31 is controlled by the opening or closing of the electromagnetic valve. During the low temperature measurement, the CDA gas is required and entered, whereby the air in the hollow tube 31 is almost not subjected to heat exchange with the gas in the temperature control box 20, so that condensed water can be prevented from being generated on the photoelectric detection lens 42.

In some embodiments, the photoelectric detector assembly 40 includes a photoelectric detector 41, a photoelectric detection lens 42, an interface structure 43. The interface structure 43 is disposed on the top of the tubular assembly 30, the photoelectric detection lens 42 is disposed on a bottom of the photoelectric detector 41, and the photoelectric detection lens 42 is connected to the interface structure 43 and is coaxially arranged with the hollow tube 41 of the tubular assembly 40. The interface structure 43 is provided with a hollow communicating with the tubular assembly 40. The photoelectric detection lens 42 is docked in the hollow.

Figure 2:
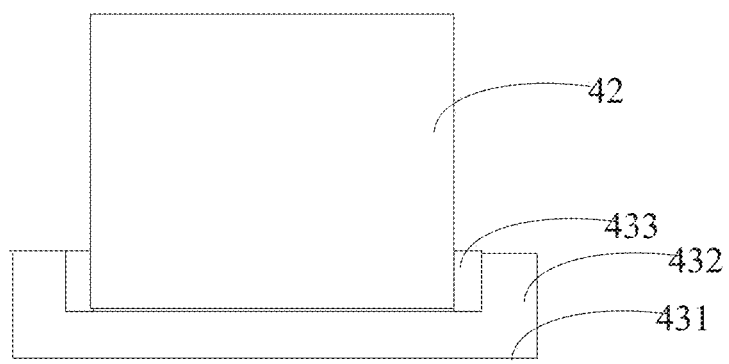
FIG. 2 is a schematic diagram of the interface structure of a liquid crystal display device according to an embodiment of the present invention.

In some embodiments, also referring to FIG. 2, the interface structure 43 includes a substrate 431 and a tubular connector 432. The tubular connector 431 is arranged along a boundary of the substrate 431. The hollow is positioned in a central portion of the substrate 431. An elastic limiting ring 433 is arranged between an inner side of the tubular connector 432 and an outer side of the photoelectric detection lens 42. The interface structure 43 is detachably connected to the top end of the hollow tube 41 by a buckling connection, or may be connected thereto by a threaded connection. Correspondingly, a screw connection or a buckling connection is required at the bottom of the substrate 431.

In some embodiments, the shutter assembly 50 is an electrically controlled switch assembly, and the shutter assembly 50 is opened when the heating platform heats so that the gas can be exhausted, and the shutter assembly 50 is closed when the heating platform cools, so that the external vapor can be prevented from entering the apparatus to thereby avoid condensed water formed on the testing sample.

In the above embodiments, the description of each embodiment has its own emphasis, and the parts that are not detailed in a certain embodiment can be referred to the related descriptions of other embodiments.

The test apparatus of a liquid crystal display provided by the embodiment of the present application is described in detail. The principle and the implementation manner of the present application are described in the embodiments. The description of the aforesaid embodiments is only used to help understand the technical solutions of the present invention and the core idea thereof. One of ordinary skill in the art should understand that the technical solutions described in the embodiments can still be modified, or equivalently replacing some of the technical features. However, any modifications, equivalent replacements and improvements based on the spirit and principles of the above embodiments should also be included in the protection scope of the present technology solution.

What is claimed is:

1. A test apparatus of a liquid crystal display, comprising: a heating platform, a temperature control box, a tubular assembly, a photoelectric detector assembly and a shutter assembly;
    wherein an upper surface of the heating platform is provided with a heating area, the temperature control box is disposed on the heating area, an opening is defined in a top of the temperature control box, the tubular assembly is connected to the temperature control box around the opening and communicates with an inside of the temperature control box, the shutter assembly is disposed within the tubular assembly, the photoelectric detector assembly is disposed on a top of the tubular assembly and faces toward to the temperature control box, the shutter assembly is opened when test is carried out and closed when the heating platform heats or cools;
    wherein the tubular assembly includes a through hole in a wall thereof, the through hole is positioned above the shutter assembly and connects with an inlet pipe to entrance of drying gas;
    wherein the photoelectric detector assembly includes a photoelectric detector, a photoelectric detection lens and an interface structure; and
    wherein the interface structure is disposed on the top of the tubular assembly, the photoelectric detection lens is disposed on a bottom of the photoelectric detector, the photoelectric detection lens is connected to the interface structure and is coaxially arranged with the tubular assembly, the interface structure is provided with a hollow communicating with the tubular assembly, the photoelectric detection lens is docked in the hollow.

2. The test apparatus according to claim 1, further comprising a gas supply device used for providing drying gas, wherein the gas supply device communicates with the inlet pipe.

3. The test apparatus according to claim 1, wherein the interface structure includes a substrate and a tubular connector, the tubular connector is arranged along a boundary of the substrate, the hollow is positioned in a central portion of the substrate, and an elastic limiting ring is arranged between an inner side of the tubular connector and an outer side of the photoelectric detection lens.

4. The test apparatus according to claim 1, wherein the temperature control box includes a box having a top end and a bottom end, a cover covering the top end of the box, the bottom end of the box being positioned corresponding to the heating area.

5. The test apparatus according to claim 4, wherein the cover is a transparent acrylic cover or a transparent glass cover.

6. The test apparatus according to claim 4, wherein the opening is defined in the cover, the tubular assembly includes a hollow tube and a joint structure, and the hollow tube is hermetically connected to the opening of the top end of the cover through the joint structure.

7. The test apparatus according to claim 6, wherein the joint structure includes a clamping member and an elastic sealing ring positioned within the clamping member, the clamping member surrounds the opening, a bottom end of the hollow tube is inserted into the clamping member, and the elastic sealing ring is sleeved to the bottom end of the hollow tube and is abutted against the inner wall of the clamping member elastically.

8. The test apparatus according to claim 6, wherein an inner wall of the clamping member is coated with a black opaque coating.

9. A test apparatus of a liquid crystal display, comprising: a heating platform, a temperature control box, a tubular assembly, a photoelectric detector assembly and a shutter assembly;
    wherein an upper surface of the heating platform is provided with a heating area, the temperature control box is disposed on the heating area, an opening is defined in a top of the temperature control box, the tubular assembly is connected to the temperature control box around the opening and communicates with an inside of the temperature control box, the shutter assembly is disposed within the tubular assembly, the photoelectric detector assembly is disposed on a top of the tubular assembly and faces toward to the temperature control box, the shutter assembly is opened when test is carried out and closed when the heating platform heats or cools.

10. The test apparatus according to claim 9, wherein the tubular assembly includes a through hole in a wall thereof, the through hole is positioned above the shutter assembly and connects with an inlet pipe to entrance of drying gas.

11. The test apparatus according to claim 10, further comprising a gas supply device used for providing drying gas, wherein the gas supply device communicates with the inlet pipe.

12. The test apparatus according to claim 9, wherein the photoelectric detector assembly includes a photoelectric detector, a photoelectric detection lens, an interface structure, the interface structure is disposed on the top of the tubular assembly, the photoelectric detection lens is disposed on a bottom of the photoelectric detector, the photoelectric detection lens is connected to the interface structure and is coaxially arranged with the tubular assembly, the interface structure is provided with a hollow communicating with the tubular assembly, the photoelectric detection lens is docked in the hollow.

13. The test apparatus according to claim 12, wherein the interface structure includes a substrate and a tubular connector, the tubular connector is arranged along a boundary of the substrate, the hollow is positioned in a central portion of the substrate, and an elastic limiting ring is arranged between an inner side of the tubular connector and an outer side of the photoelectric detection lens.

14. The test apparatus according to claim 9, wherein the temperature control box includes a box having a top end and a bottom end, a cover covering the top end of the box, the bottom end of the box being positioned corresponding to the heating area.

15. The test apparatus according to claim 14, wherein the cover is a transparent acrylic cover or a transparent glass cover.

16. The test apparatus according to claim 14, wherein the opening is defined in the cover, the tubular assembly includes a hollow tube and a joint structure, and the hollow tube is hermetically connected to the opening of the top end of the cover through the joint structure.

17. The test apparatus according to claim 16, wherein the joint structure includes a clamping member and an elastic sealing ring positioned within the clamping member, the clamping member surrounds the opening, a bottom end of the hollow tube is inserted into the clamping member, and the elastic sealing ring is sleeved to the bottom end of the hollow tube and is abutted against the inner wall of the clamping member elastically.

18. The test apparatus according to claim 16, wherein an inner wall of the clamping member is coated with a black opaque coating.

\* \* \* \* \*